Feb. 18, 1936.  W. M. SMITH ET AL  2,030,945
CONTROL SWITCH MECHANISM
Filed Feb. 26, 1934  2 Sheets-Sheet 1

Inventors
William M. Smith
and Paul B. Parks
Edward A. Russell
By
Attorneys.

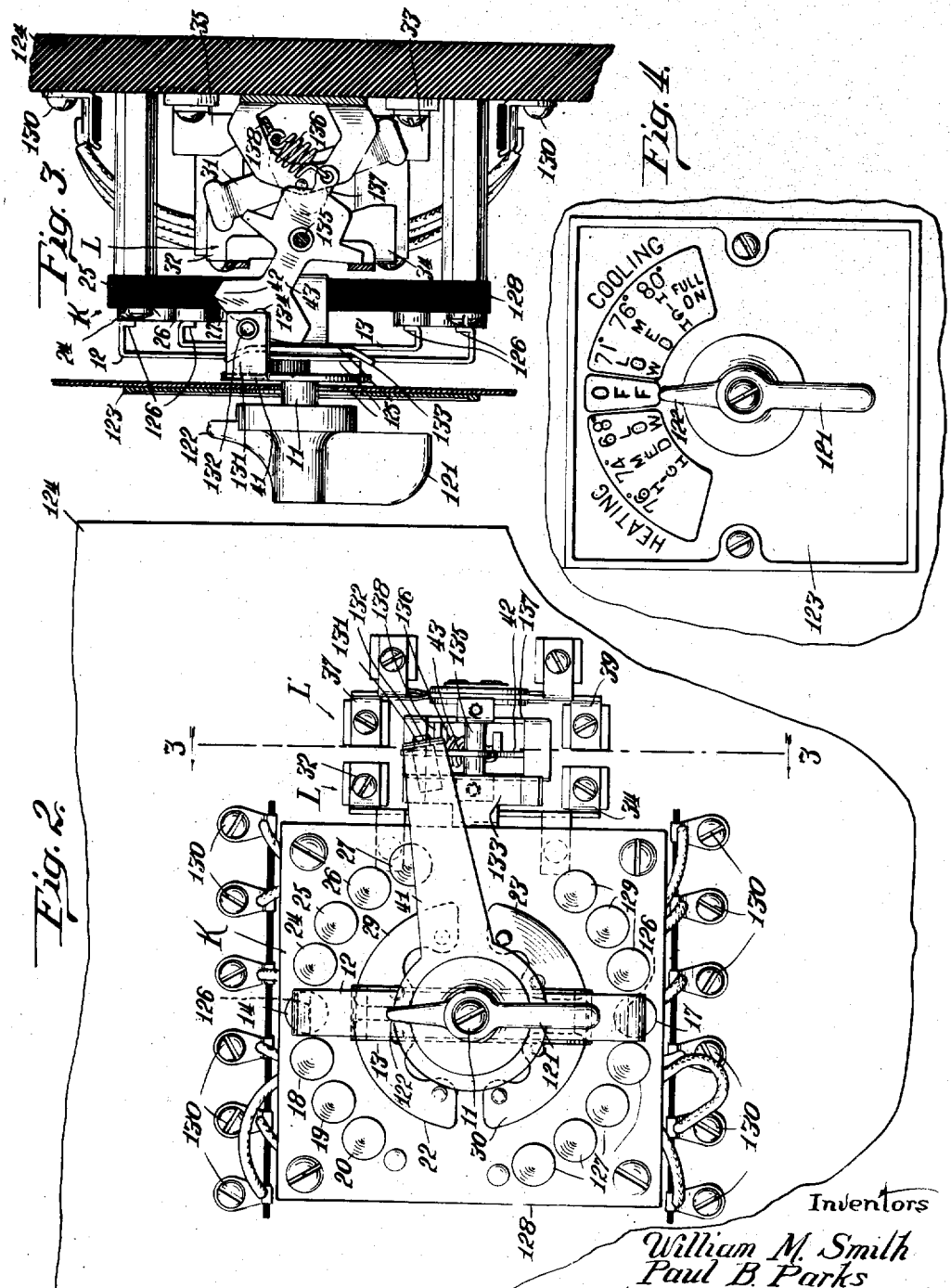

Patented Feb. 18, 1936

2,030,945

UNITED STATES PATENT OFFICE 2,030,945

CONTROL SWITCH MECHANISM

William M. Smith, Chicago, Paul B. Parks, Oak Park, and Edward A. Russell, Chicago, Ill., assignors to Vapor Car Heating Company, Inc., Chicago, Ill., a corporation of New York Application February 26, 1934, Serial No. 713,002

9 Claims. (Cl. 236—1)

This invention relates to certain new and useful improvements in control switch mechanism, and more particularly to a manually operable control device for a system for regulating the temperature within an enclosure.

In a certain type of temperature regulating system for an enclosure, such as a railway car, both a heating means and a cooling means are provided, one operable for maintaining temperatures within the enclosure above the prevailing outside temperature and the other for maintaining temperatures within the enclosure below the prevailing outside temperature. Thermostatically controlled electrically actuated means is provided for controlling the heating or cooling means so as to automatically maintain any one of a plurality of predetermined temperatures within the enclosure.

According to the present invention a single manually operable control switch mechanism is provided for adjusting the thermostatic mechanism to select the desired temperature and for rendering either the heating means or the cooling means operative as conditions may require. This control device includes a pivoted control member which may be swung in either direction from a central neutral position, in which neither the heating means nor the cooling means is operative. When swung in one direction (for example, counter-clockwise) from the central or neutral position, the heating means will be rendered operative and the temperature to be maintained is determined by the selected position to which the member is swung in this direction. On the other hand, if the controlling member is swung in the opposite (for example, clockwise) direction from the neutral position, the cooling mechanism will be rendered operative and the selected temperature to be maintained is determined by the position to which the controlling member is swung in this direction. The controlling mechanism comprises a plurality of relays or similar electrically operated devices, some of which perform one function in connection with the heating apparatus and another function in connection with the cooling apparatus. For this reason these devices are connected in two alternative circuits, and a double acting snap switch, or a plurality of such switches, serve to alternatively complete one or the other of these circuits, thus determining the functioning at any one time of these relays. Mechanical connections are provided for throwing the snap switch or snap switches from one position to the other as the manually operable control member is swung from one side to the other of its central or neutral position.

The principal object of this invention is to provide an improved control switch mechanism of the type briefly described hereinabove and disclosed more in detail in the specifications which follow.

Another object is to provide an improved temperature regulating system for an enclosure.

Another object is to provide an improved manually operable temperature selecting device cooperating with an automatic temperature control system adapted to maintain temperatures both above and below the prevailing normal temperature.

Other objects and advantages of this invention will be more apparent from the following detailed description of one approved form of mechanism constructed and operating according to the principles of this invention.

In the accompanying drawings:

Fig. 2 is a partial plan view of the control switch, with the outer cover plate removed.

Fig. 3 is a vertical section taken substantially on the line 3—3 of Fig. 2.

Fig. 4 is a plan view similar to Fig. 2, but with the cover plate and indicating dial in position.

Figure 1:
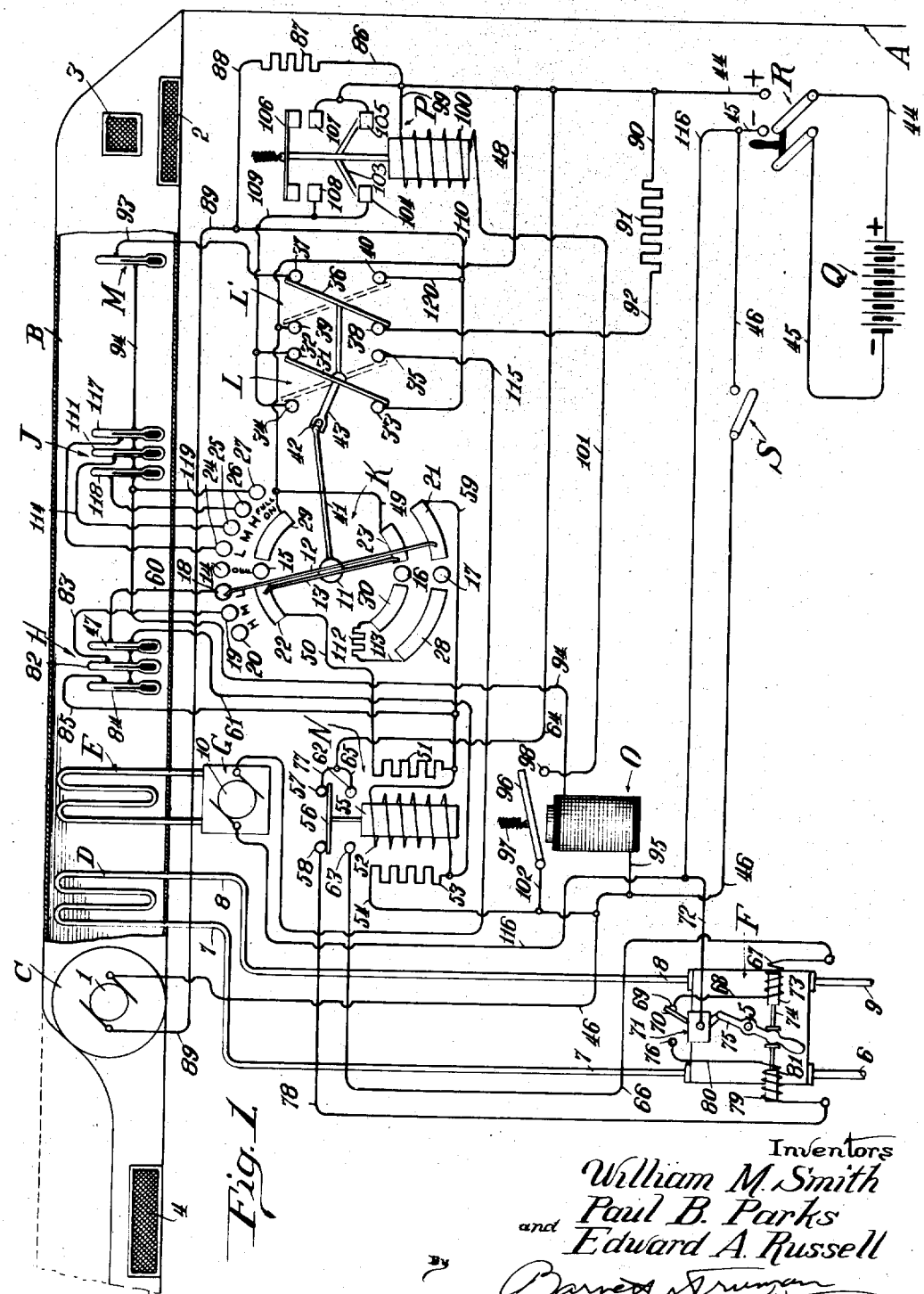
Fig. 1 is a diagrammatic elevation of the complete temperature control system.

Referring first to Fig. 1, at A is shown a portion of the outer wall of an enclosure in which is a passage B through which air is propelled by means of the blower shown at C. Air is drawn into the passage through an inlet 2 leading from the enclosure, together with a certain percentage of fresh air drawn in at 3 from the outer air, and after the temperature of this air has been suitably changed by either the heating means indicated at D or the cooling means indicated at E, the air is forced back into the enclosure through a series of outlets, one of which is indicated at 4. The heating means D and cooling means E are here shown in the form of pipe coils through which the heating or cooling medium is circulated, but it will be understood that any other suitable form of device, by means of which heat is imparted to or withdrawn from the air stream, can be substituted.

At F is indicated a suitable valve for controlling the flow of steam or other heating medium, this valve being controlled by the intermediately pivoted lever, indicated at 5. When this lever is in the position shown in the drawings, the valve will be open and steam will flow from the source of supply through pipe 6 into and through the valve F, thence through pipe 7 to and through the heating means D and back through pipe 8 to valve F and thence through pipe 9 to a vapor-regulator or other suitable steam control device.

When lever 5 is thrown to a correspondingly inclined position at the other side of the vertical (as will be hereinafter apparent) the valve will be closed and the steam will simply flow from pipe 6 through the valve structure F and out through pipe 9, there being no flow of heating medium through the heating element D.

At G is indicated a suitable mechanical refrigerating device which is driven by the motor indicated at 10. When the motor 10 is in operation, the refrigerating medium will be circulated through the cooling pipe E. When the motor 10 is not in operation, this circulation of the refrigerating medium will stop.

At H is indicated a group of thermostats which are positioned within the passage B and respond to the temperature of the air stream drawn through this passage, a selected one of these thermostats operating as hereinafter described to control the valve F, and thereby control the flow of heating medium through element D. A similar group of thermostats is indicated at J, a selected one of these thermostats operating to control the motor 10 and thereby control the refrigerating element E.

At K is indicated the manually operable control switch mechanism. This device will be hereinafter described more in detail in connection with Figs. 2, 3 and 4, but for the present will be described in connection with the diagrammatic showing in Fig. 1. The centrally pivoted member indicated at 11 is provided with a knob or other handle device by which it may be swung or oscillated in opposite directions from a central or neutral position. This control member 11 carries a relatively long bridging contact member 12 and a shorter bridging contact 13, these contact members being suitably insulated from one another. When the control member is in its central or neutral position, these bridging contacts 12 and 13 will extend vertically (as shown in Fig. 1) so as to rest on the several contact members 14, 15, 16 and 17 with which there are no electrical connections. When the control switch is in this position, none of the circuits will be completed and both the heating and cooling systems will be inoperative. When the control member 11 is swung in one direction from its neutral position (counter-clockwise in the example here shown) the upper end of contact 12 may be engaged alternately with any one of the fixed contacts 18, 19 and 20 so as to adjust the heating means D for maintaining relatively low, medium or high temperatures, as hereinafter more fully disclosed. When in any of these three positions, the lower end of bridging contact 12 will engage a fixed arcuate contact member 21, and the shorter bridging contact 13 will engage the arcuate contacts 22 and 23 with its upper and lower ends, respectively.

When the control member is swung in the opposite, or clockwise direction, from its central or neutral position, the upper end of bridging contact 12 is adapted to be selectively engaged with any one of the fixed contacts 24, 25, 26 or 27. When engaged with contacts 24, 25 or 26, the refrigerating element E will be controlled to maintain relatively low, medium or high temperatures in the circulating air stream. When moved into engagement with contact 27, the refrigerating element E will be continuously operated regardless of changes in the temperature of the air stream. When in any one of these last "cooling" positions, the lower end of bridging contact 12 will be in engagement with an arcuate contact member 28, and the upper and lower ends of the shorter bridging contact 13 will be respectively in engagement with the arcuate contacts 29 and 30.

At L and L' are shown a pair of similar snap switches which are operated by and in cooperation with the control switch K. The switch L comprises a centrally pivoted contact member 31 which, when in the position shown in solid lines, is adapted to connect the two fixed contacts 32 and 33. When the switch is snapped to the position shown in dotted lines, the contact member 31 will engage and electrically connect the two fixed contacts 34 and 35. In an exactly similar manner the other snap switch L' comprises a pivoted contact plate 36 which in one position electrically connects the two fixed contacts 37 and 38, and when in its second or dotted line position, connects the two fixed contacts 39 and 40. These two snap switches are so connected as to be operated in unison. As here shown, an arm 41 extending from the control member 11 of switch K is adapted to engage the forked end 42 of a crank arm 43 connected with the snap switches. When the switch element 11 is thrown from one side to the other of its central or neutral position, this crank mechanism 41, 42 and 43 will be operated to snap the switches L and L' from one of their operative positions to the other. The snap switches may be in one of these positions (it is immaterial which one) when the control switch K is in its central or neutral position.

At M is indicated a thermostat which is adapted to control the speed of the fan or blower C while the heating system is in operation. At N is a relay mechanism adapted to operate the valve F. At O and P are indicated a pair of relay devices which are adapted to function in connection with the thermostat M to control the speed of the fan when the heating system is operating, and which are adapted to function in connection with the thermostats J to control the refrigerating element G when the cooling system is in operation. In order to permit the relays O and P to perform these dual functions, these relays are connected in two alternative circuits which are respectively closed by the snap switches L and L' as will be more apparent hereinafter.

The positive and negative mains 44 and 45 extend from the battery Q (or other suitable source of power) through the main cut-off switch R. A fan control switch S is positioned in wire 46 extending from negative main 45 to one terminal of the fan motor I. The switch S must be closed before the fan or blower can operate, and as will be hereinafter apparent, none of the heating or cooling mechanisms can effectively operate unless this fan switch S is closed.

When the control switch K is swung to the position shown in solid lines in Fig. 1, the heating system will be rendered operative, and the low temperature thermostat 47 of thermostatic group H will be in control of the heating system so as to automatically maintain a relatively low temperature (for example 68° Fahrenheit) in the circulating air stream. Under these conditions, relay N may be energized through the following circuit: From positive main 44 through wires 48 and 49, arcuate contact plate 23, bridging contact 13, arcuate contact plate 22, wire 50, resistance 51, solenoid coil 52, resistance 53, and wires 54 and 46 to the negative main 45. As long as solenoid coil 52 is energized, the core 55 will be held up in the centralized position shown so as to hold contact plate 56 in bridging engagement with the upper pair of fixed contacts 57 and 58. When the temperature of the circulating air stream reaches the predetermined temperature for which thermostat 47 is adjusted, a shunt circuit adapted to de-energize the relay coil 52 will be completed as follows: From one terminal of solenoid coil 52 through wire 59, arcuate contact plate 21, bridging contact 12, fixed contact 18, wire 60, mercury column of thermostat 47, and wire 61 to the other terminal of solenoid coil 52. Since the main portion of the current will now flow through this shunt circuit, the solenoid coil 52 will be so weakened that the core 55 will drop and bring contact plate 56 into engagement with a second pair of fixed contacts 62 and 63. A valve operating circuit will now be completed as follows: From positive main 44 through wires 64 and 65, contacts 62, 56 and 63 of the relay N, wire 66, solenoid coil 67, wire 68, fixed and movable contacts 69 and 70 of the snap switch 71, and wires 72 and 116 to the negative main 45. The energized solenoid 67 will draw in the core 73 which is connected through stem 74 with one arm of the switch actuating lever 5 so that this lever will be swung over to its opposite position so as to close the valve F. As this valve closing movement is completed, the upper arm 75 of lever 5 will operate the snap switch 71 so as to break the actuating circuit just described by moving the contact 70 out of engagement with fixed contact 69 and into engagement with a second fixed contact 76. When the temperature of the circulating air stream has fallen sufficiently, the shunt circuit through thermostat 47 will be broken by the mercury column moving down out of engagement with the upper fixed contact to which wire 60 is attached. The solenoid coil 52 will now again be energized to lift the core 55 and complete the circuit between fixed contacts 57 and 58. A valve-opening circuit will now be completed as follows: From positive main 44 through wires 64 and 77, relay contacts 57, 56 and 58, wire 78, solenoid coil 79, wire 80, fixed and movable contacts 76 and 70 of the snap switch 71, and wires 72 and 116 to negative main 45. The solenoid 79 will now be energized to draw back the core 81 to the position now shown in Fig. 1 and thus return valve lever 5 to the position shown in which the valve is open. This movement of valve lever 5 will also serve to return snap switch 71 to its original position so as to break the valve-opening circuit and again bring movable contact 70 into engagement with fixed contact 69.

If the control switch K is moved further in a counter-clockwise direction until the upper end of bridging contact 12 is in engagement with the fixed contact 19, the medium temperature thermostat 82 will be selected to control the heating system. When the air stream reaches a certain predetermined temperature (for example 74° Fahrenheit,) a shunt circuit for de-energizing the solenoid 52 will be completed as follows: From one terminal of coil 52 through wire 59, arcuate contact 21, bridging contact 12, fixed contact 19, wire 83, thermostat 82 and wire 61 to the other terminal of coil 52. The valve F will now be operated in exactly the same manner as hereinabove described but will be left open until a somewhat higher temperature is reached in the circulating air stream.

When switch K is moved so as to bring the upper end of bridging contact 12 in engagement with fixed contact 20, the high temperature thermostat 84 will be in control of the heating system. When the predetermined high temperature (for example 76° Fahrenheit) is reached, a shunt circuit for de-energizing the solenoid coil 52 will be completed as follows: Through wires 59 and 85, thermostat 84, and wire 61 to the other terminal of coil 52.

It will be noted that when the control switch K is in any one of the three positions last described, the bridging contact 13 will establish connection between the two arcuate contacts 23 and 22, thus maintaining the energizing circuit for relay N. However, if the control switch K is thrown to the other side of the vertical so as to render the refrigerating mechanism operative, the contact 13 will no longer connect the fixed contacts 22 and 23 and this relay energizing circuit will be broken. The core 55 of relay N will then drop to establish the valve-closing circuit so that the supply of heating medium to the heating element D will be cut off and will remain cut off until the control switch K is again swung in a counter-clockwise direction beyond the vertical or neutral position.

When the heating system is in operation, and the temperature of the circulating air stream is below a certain predetermined temperature for which thermostat M is adjusted, the fan motor 1 will be energized through the following circuit: From positive main 44, through wire 86, fan speed resistor 87, wire 88, wire 89, motor 1, and wire 46 to the negative main. Under these conditions the fan or blower will be operated at a comparatively slow speed. When the temperature of the circulating air stream rises above the predetermined, comparatively low temperature for which thermostat M is adjusted, a control circuit through this thermostat will be completed as follows: From positive main 44, through wire 90, protective resistance 91, wire 92, contacts 35, 36 and 37 of snap switch L', wire 93, thermostat M, wire 94, electro-magnet coil O, and wires 95 and 46 to the negative main. This will energize the electro-magnet O so as to draw down the armature 96 (against the resistance of spring 97) into engagement with contact 98 and complete an energizing circuit for the relay P as follows: From positive main 44 through wire 99, solenoid coil 100 of relay P, wire 101, fixed and movable contacts 98 and 96 of relay O, and wires 102, 54 and 46 to the negative main.

The relay P is of the double-contact type adapted to make and break a circuit carrying a comparatively heavy current, and comprises the flexible contacts 103 adapted to first engage and bridge the fixed contacts 104 and 105, and the main movable contact 106 adapted to subsequently engage and bridge the fixed contacts 107 and 108. When this relay P is energized a full-speed fan circuit will be completed as follows: From positive main 44 to the contacts of relay P, wire 109, contacts 32, 31 and 33 of snap switch L, wires 110 and 89 to fan motor 1, and from the motor through wire 46 to the negative main. It will be noted that this circuit cuts out the resistance 87 so as to permit the fan or blower to operate at a higher speed. Since a certain proportion of fresh air from outside the enclosure is being drawn in through the inlet 3, it is desirable in cold weather to cut down the speed of the fan so as to decrease the amount of this cold outside air that is drawn in when the temperature of the air within the enclosure has been lowered below a certain point, thus preventing undue chilling of the circulating air due to the addition of an excess quantity of cold outside air. For example, in a railway car the steam supply may be cut off for a considerable period of time while the engine is being changed or cars are being cut in or out of the train. If at such times the temperature falls below the predetermined temperature for which thermostat M is adjusted, the speed of the fan or blower will be cut down so as to materially diminish the amount of cold outside air that is drawn in through inlet 3. As soon as the necessary steam supply is again obtained and the heating system has raised the temperature of the circulating air above the predetermined temperature for which thermostat M is adjusted, this thermostat in conjunction with the relays O and P will operate to cut out the resistance 87 and permit the fan to again operate at high speed, thus causing the normal air circulation and drawing in the full supply of fresh air through inlet 3.

If control switch K is thrown in a clockwise direction to the other side of the vertical, the heating system will no longer be operative and the cooling or refrigerating system will now be conditioned for operation. Assuming that the switch K has been moved in this direction until the upper end of bridging contact 12 is in engagement with fixed contact 25, the thermostat 111 in thermostatic group J will now be in control of the refrigerating apparatus G so as to keep the temperature of the circulating air stream down to a predetermined "medium" temperature. When the temperature of the air stream drawn through passage B rises to this predetermined medium temperature for which thermostat 111 is adjusted, a control circuit through this thermostat will be completed as follows: From positive main 44, through wire 48, fixed arcuate contact 29, bridging contact 13, arcuate contact 30, protective resistance 112, wire 113, arcuate contact 28, bridging contact 12, fixed contact 25, wire 114, mercury column of thermostat 111, wire 94, relay O and wires 95 and 46 to the negative main. The relay O will draw down the armature 96 so as to close the previously described energizing circuit for relay P which in turn will close its contacts so as to complete an energizing circuit for the motor 10 of refrigerating apparatus G, as follows: From positive main 44, through the contacts of relay P, wire 109, contacts 34, 31 and 35 of snap switch L (this switch is now thrown to the dotted line position), wire 115, motor 10, and wire 116, back to the negative main 45. Cooling medium will now be circulated through coil E so as to lower the temperature of the air stream in passage B. When this temperature has been lowered below the predetermined medium temperature for which thermostat 111 is set, the energizing circuit for relay O will be broken at this thermostat, thereby breaking the energizing circuit for relay P which will in turn open the energizing circuit for motor 10 and stop the refrigerating apparatus. In an exactly similar manner if switch K is moved so as to engage the upper end of movable contact member 12 with either of the fixed contacts 24 or 26, either the thermostat 117 or the thermostat 118 will be placed in control of the refrigerating system so as to maintain either a comparatively low or a comparatively high temperature in the circulating air stream. The controlling circuits through these thermostats are substantially the same as the one previously described through thermostat 111. If the movable element 11 of control switch K is moved so as to bring contact member 12 in engagement with fixed contact 27, a control circuit will be completed from this contact 27 through wires 119, 94, direct to the relay O without passing through any of the thermostats. The relay O will remain energized as long as the control switch is left in this position, and as a consequence the motor 10 of refrigerating element G will be continuously energized so that the refrigerating apparatus E will operate continuously, no matter what the temperature of the circulating air may be. As long as the control switch K is in any of the "cooling" positions last described, a full-speed fan circuit will be completed as follows: From positive main 44, through wire 48, contacts 39, 36 and 40 of snap switch L', wires 120, 110 and 89, motor 1, and wire 46 to the negative main 45. It will be noted that this circuit cuts out the fan resistance 87 so that the fan or blower will operate continuously at high speed.

The actual construction of the control switch mechanism K and the cooperating snap switches L and L' will now be described more in detail, referring to Figs. 2, 3 and 4. The manually adjustable element 11 of switch K comprises an operating handle 121 by means of which the pointer 122 is moved to the selected position on the dial on cover plate 123 (see Fig. 4). The operating elements of the several switches are confined between the cover plate 123 and the supporting panel 124. The cover plate 123 has been omitted in Fig. 2. The bridging contact members 12 and 13 are mounted on the central spindle 11 but are insulated from one another and from the spindle by means of the insulating discs 125. The several end portions of the plates 12 and 13 are bent downwardly and then inwardly, as indicated at 126, these inwardly projecting end portions being curved downwardly so as to snap into the concaved outer faces of the several fixed contact members 14, 18, 24, etc. The several lower contact members indicated at 127 (Fig. 2) are connected at the back of the supporting plate 128 so as to correspond to the single arcuate contact indicated at 28 in Fig. 1, and in a similar manner the several contacts, indicated at 129, are connected so as to correspond to the single arcuate contact 21, indicated in Fig. 1. The several contact members are connected, respectively, to the several individual binding posts, indicated at 130, to which the several circuit wires are attached, as will be apparent from Fig. 1.

The arm 41 projecting laterally from the rotatable element 11 to which it is secured has a down-turned outer end portion 131 from which a pin 132 projects inwardly so as to engage at times beneath the guide plate 133. As the arm 41 is swung past a substantially horizontal position (as seen in Figs. 2 and 3) the pin 132 will engage in the slot 134 in the forked upper end 42 of lever 43 which is intermediately pivoted at 135. A compression spring 136 is confined between the lower end 137 of lever 43, and the lower portion of a rocking frame 138 which carries the movable contacts 31 and 36 of the snap switches L and L', respectively. As the lever 43 is swung slightly past its central position, the spring 136 will act to quickly snap the movable switch contacts from one of their positions to the other, as usual in this type of switch. No especial novelty is claimed for this snap-switch mechanism aside from the fact that the two independent switches L and L' are simultaneously and automatically operated by means of arm 41 as the operating element 121 of control switch K is moved from the heating to the cooling side of its dial or vice versa.

It will be noted that all of the currents passing through the contacts of control switch K are relatively weak, being adapted for operating thermostats and relay coils, whereas the relatively heavy currents used for operating the fan motor 1 and refrigerating motor 10 are passed through the contacts of relay P and the snap-switches L and L'. For this reason it is preferable to use snap-switches of this type, capable of carrying heavy current, rather than adding additional contacts on the control switch K.

We claim:

1. In an electrically operated temperature regulating mechanism including both heating and cooling means, a manually operable controlling device comprising a control member pivotally mounted to swing in either direction to selected positions from a central neutral position, bridging contacts carried by the control member, and two groups of fixed contacts positioned so as to be respectively engaged by the bridging contacts as the control member is swung to one side or the other of its neutral position, the bridging of selected contacts in one group serving to energize and control the heating means, and the bridging of selected contacts in the other group serving to energize and control the cooling means, each group of contacts comprising pairs which are respectively connected only when the control member is in one selected position, and other contacts which are connected while the control member is in any selected position at one side of its neutral position.

2. Means for regulating the temperature within an enclosure comprising in combination with a heating means, a cooling means, and electrically operated mechanism for controlling the heating or cooling means to automatically maintain any one of a plurality of predetermined temperatures within the enclosure, a manually operable selector device comprising a control member rotatable in either direction from a central neutral position, bridging contacts carried by the control member, and two groups of fixed contacts positioned so as to be respectively engaged by the bridging contacts as the control member is swung to one side or the other of its neutral position, the bridging of selected contacts in one group serving to energize and control the heating means, and the bridging of selected contacts in the other group serving to energize and control the cooling means.

3. Means for regulating the temperature within an enclosure comprising in combination with a heating means, a cooling means, and electrically operated mechanism for controlling the heating or cooling means to automatically maintain any one of a plurality of predetermined temperatures within the enclosure, a manually operable selector device comprising a control member rotatable in either direction from a central neutral position, bridging contacts carried by the control member, and two groups of fixed contacts positioned so as to be respectively engaged by the bridging contacts as the control member is swung to one side or the other of its neutral position, the bridging of selected contacts in one group serving to energize and control the heating means, and the bridging of selected contacts in the other group serving to energize and control the cooling means, each group of contacts comprising pairs which are respectively connected only when the control member is in one selected position and other contacts which are connected while the control member is in any selected position at one side of its neutral position.

4. Means for regulating the temperature within an enclosure comprising in combination with a heating means, a cooling means, and electrically operated mechanism for controlling the heating or cooling means to automatically maintain any one of a plurality of predetermined temperatures within the enclosure, a manually operable selector device comprising a control member rotatable in either direction from a central neutral position, bridging contacts carried by the control member, and two groups of fixed contacts positioned so as to be respectively engaged by the bridging contacts as the control member is swung to one side or the other of its neutral position, the bridging of selected contacts in one group serving to energize and control the heating means, and the bridging of selected contacts in the other group serving to energize and control the cooling means, the electrically operated mechanism comprising certain devices that are adapted to be connected in alternative circuits so as to alternatively function with the heating means or the cooling means, a snap switch mechanism adapted to be moved between two alternative positions so as to alternatively complete the last mentioned circuits, and connections for throwing the snap-switch mechanism from one position to the other as the control member is moved from one side of its neutral position to the other.

5. Means for regulating the temperature within an enclosure comprising a fan for circulating air through a passage, means for heating the circulating air stream, means for cooling the air stream, electrically operated mechanism for controlling the heating or cooling means to automatically maintain any one of a plurality of predetermined temperatures within the enclosure, thermostatically controlled means for controlling the speed of the fan, and a manually operable selector device comprising a control member movable in opposite directions from a central neutral position, switch contacts closed by the control member as it is moved to selected positions at one side of the neutral position for rendering the heating means operative and selecting the temperature to be maintained thereby and for completing the connections whereby the fan speed is controlled, and other switch contacts closed by the control member when moved to selected positions at the other side of the neutral position for rendering the cooling means operative and selecting the temperature to be maintained thereby.

6. Means for regulating the temperature within an enclosure comprising a fan for circulating air through a passage, means for heating the circulating air stream, means for cooling the air stream, electrically operated mechanism for controlling the heating or cooling means to automatically maintain any one of a plurality of predetermined temperatures within the enclosure, thermostatically controlled means for controlling the speed of the fan, and a manually operable selector device comprising a control member movable in opposite directions from a central neutral position, switch contacts closed by the control member as it is moved to selected positions at one side of the neutral position for rendering the heating means operative and selecting the temperature to be maintained thereby, and other switch contacts closed by the control member when moved to selected positions at the other side of the neutral position for selecting the temperature to be maintained by the cooling means, the electrically operated mechanism including relay devices which function as part of the fan speed controlling means when the control member is moved to any of the first mentioned selected positions, and which function as part of the mechanism for controlling the cooling means when the control member is in one of the last mentioned selected positions.

7. Means for regulating the temperature within an enclosure comprising a fan for circulating air through a passage, means for heating the circulating air stream, means for cooling the air stream, electrically operated mechanism for controlling the heating or cooling means to automatically maintain any one of a plurality of predetermined temperatures within the enclosure, thermostatically controlled means for controlling the speed of the fan, and a manually operable selector device comprising a control member movable in opposite directions from a central neutral position, switch contacts closed by the control member as it is moved to selected positions at one side of the neutral position for rendering the heating means operative and selecting the temperature to be maintained thereby, and other switch contacts closed by the control member when moved to selected positions at the other side of the neutral position for selecting the temperature to be maintained by the cooling means, the electrically operated mechanism including relay devices which function as part of the fan speed controlling means when the control member is moved to any of the first mentioned selected positions, and which function as part of the mechanism for controlling the cooling means when the control member is in one of the last mentioned selected positions, alternative circuits in which said relay devices may be included to determine the functioning thereof, switch mechanism movable between two alterative operative positions for alternatively completing said circuits, and means actuated by the control member for moving the last mentioned switch mechanism from one of these positions to the other as the control member is moved from one side to the other of its neutral position.

8. In an electrically operated temperature regulating mechanism including both heating and cooling means, a manually operable controlling device comprising a control member pivotally mounted to swing in either direction to selected positions from a central neutral position, bridging contacts carried by the control member, and two groups of fixed contacts positioned so as to be respectively engaged by the bridging contacts as the control member is swung to one side or the other of its neutral position, the bridging of selected contacts in one group serving to energize and control the heating means, and the bridging of selected contacts in the other group serving to energize and control the cooling means, a snap-switch movable between two effective positions to complete two alternative circuits, one of these circuits forming a part of the regulating system for the heating means, and the other circuit forming a part of the regulating system for the cooling means, and means operated by the control member as it is swung to one side or the other of its neutral position to snap the switch from one of its positions to the other, so that the heat regulating circuit will be completed at the snap switch when any of the selected heat controlling contacts are bridged, and the regulating circuit for the cooling means will be completed at the snap switch when any of the selected contacts for the cooling means are bridged.

9. Means for regulating the temperature within an enclosure comprising in combination with a heating means, a cooling means, and electrically operated mechanism for controlling the heating or cooling means to automatically maintain any one of a plurality of predetermined temperatures within the enclosure, a manually operable selector device comprising a control member rotatable in either direction from a central neutral position, bridging contacts carried by the control member, and two groups of fixed contacts positioned so as to be respectively engaged by the bridging contacts as the control member is swung to one side or the other of its neutral position, the bridging of selected contacts in one group serving to energize and control the heating means, and the bridging of selected contacts in the other group serving to energize and control the cooling means, a snap-switch movable between two effective positions so as to complete two alternative circuits, one circuit forming a part of the regulating system for the heating means, and the other circuit forming a part of the regulating system for the cooling means, and means operated by the control member to snap the switch from one of its positions to the other as the control member is moved from one side of its neutral position to the other so that the heat regulating circuit will be completed at the snap switch when any of the selected heat controlling contacts are bridged, and the regulating circuit for the cooling means will be completed at the snap switch when any of the selected contacts for the cooling means are bridged.

WILLIAM M. SMITH.
PAUL B. PARKS.
EDWARD A. RUSSELL.